United States Patent [19]

Fujie et al.

[11] 4,431,575

[45] Feb. 14, 1984

[54] FOAMABLE POLYOLEFIN RESIN COMPOSITION

[75] Inventors: Akira Fujie; Minoru Hisamatsu, both of Suzuka, Japan

[73] Assignee: The Dow Chemical Company, Midland, Mich.

[21] Appl. No.: 439,666

[22] Filed: Nov. 8, 1982

[51] Int. Cl.$^3$ ............................................... C08J 9/14
[52] U.S. Cl. ..................................... 252/502; 252/511; 521/79; 521/82; 521/94; 521/143; 521/144; 521/149; 524/210; 524/495; 524/496
[58] Field of Search ..................... 521/79, 82, 94, 143, 521/144, 149; 252/511, 502; 524/210

[56] References Cited

U.S. PATENT DOCUMENTS 4,214,054 7/1980 Watanabe et al. .................... 521/95

Primary Examiner—Morton Foelak
Attorney, Agent, or Firm—David B. Kellom

[57] ABSTRACT

Electroconductive olefin polymer foams which are suitable for use as packaging/cushioning materials for sensitive electronic parts are prepared from olefin polymer compositions which comprise a major proportion by weight of an olefin polymer, from 5 to 30 weight percent, based on said olefin polymer, of an electroconductive carbon black and from 0.1 to 10 weight percent, based on said olefin polymer of a saturated fatty acid amide compound.

12 Claims, 1 Drawing Figure

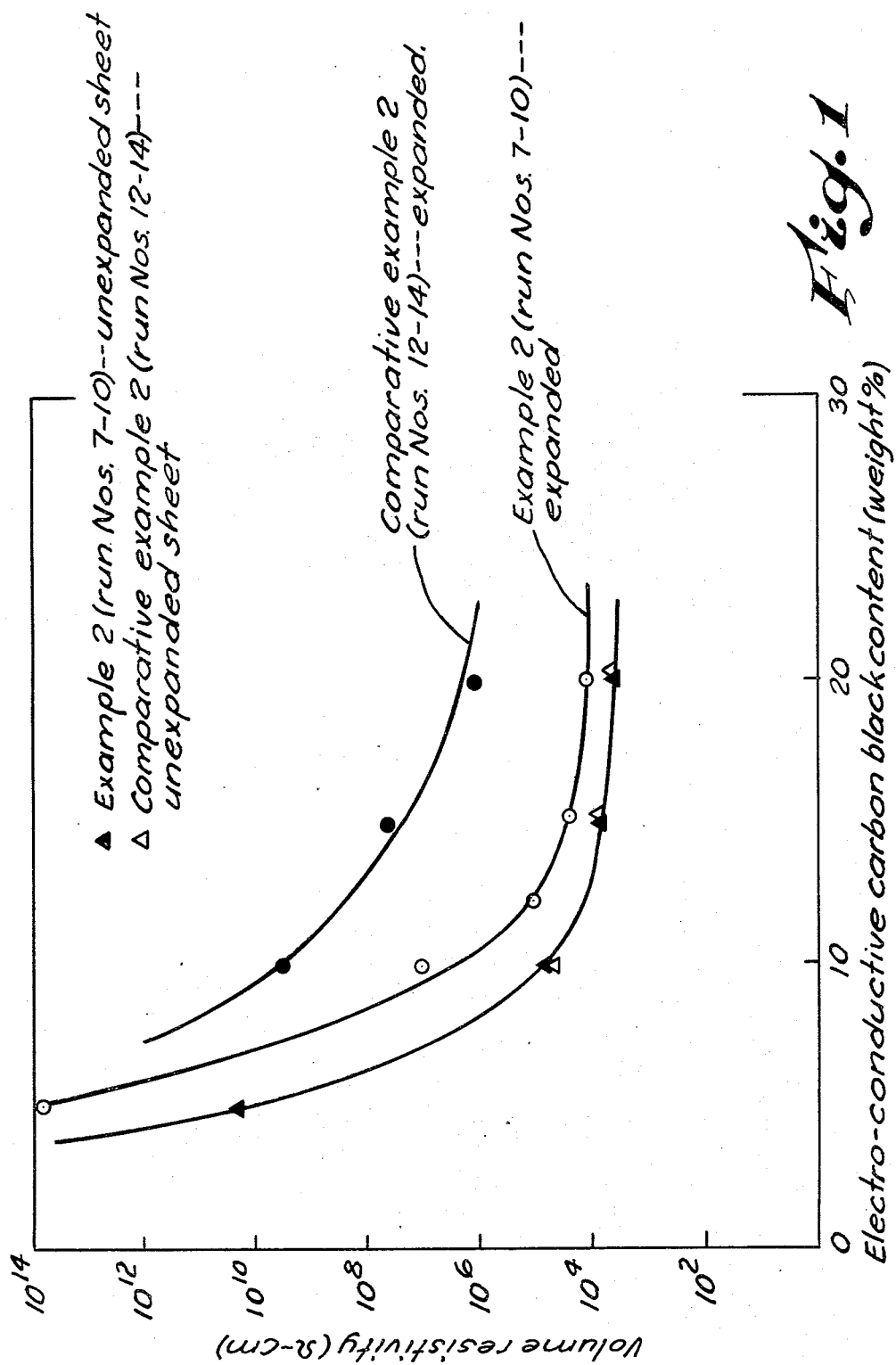

FOAMABLE POLYOLEFIN RESIN COMPOSITION

BACKGROUND OF THE INVENTION

The present invention relates to an olefin polymer resin composition which has improved electroconductivity and excellent processability and which comprises an olefin polymer resin, an electroconductive carbon black and an amide compound. The present invention also relates to foamable compositions and foamed articles prepared from said olefin polymer resin composition.

It is well known to obtain an electroconductive resin by mixing an electroconductive carbon black with a polyolefin resin. Some of these resins have been already practically used and, owing to the excellent electrical properties thereof, they are widely used as materials for various electric and electronic parts in a variety of appliance and automotive applications and the like. Recently, as electronic appliances have become highly advanced and highly accurate, there have been used integrated circuit, large-scale integrated circuit and, further, very-large-scale integrated circuit. In the case of parts of electronic appliances such as the above-noted integrated circuits or precision electric appliances, various problems such as electrostatic breakdown or attachment of dusts arise. In order to solve these problems, it was desired heretofore to develop a packaging material which does not bring about the electrostatic breakdown and which has moreover a cushioning capability. However, such a material has not been realized yet.

It is considered that this is due to the fact that a polyolefin resin comprising a large amount of carbon black has poor melt-viscoelasticity when molten and that it is therefore difficult for such a composition to maintain the closed cell internal gas pressure necessary for foaming, thereby resulting in impossibility of high expansion.

For instance, in Japanese patent application Laid-Open No. 47958/1973, there is disclosed a process for the manufacture of polypropylene resin foamed product containing carbon black. However, in lines 3-6 on page 5 of said publication, there is a description that an amount of the carbon black exceeding 0.1 weight part is not desirable because of the aggregation of cells during the growth thereof resulting in an undesirable increase of cell size.

A primary object of the present invention is to provide an electroconductive olefin polymer resin foamed product and, in particular, a foamed product suitable for use in packaging electronic appliance parts and the like which are sensitive to static electricity, in which case said foamed product should have a volume resistivity of $10^8 \Omega.cm$ or less, preferably $10^3$-$10^7 \Omega.cm$ is desirable. A further object of the present invention is to provide a composition of an olefin polymer resin which enables one to easily produce a low density foamed product having closed-cellular structure consisting of uniform-sized, fine cells, high cushioning capability and electroconductivity. Yet another object is to provide an olefin polymer resin composition from which there can be obtained an economically advantageous and electroconductive foamed product having a low volume resistivity in spite of a low ratio of electroconductive carbon black added to the resin.

SUMMARY OF THE INVENTION

It has now been found that, when expanded, the composition of this invention shows remarkably low volume resistivity as compared with an expanded composition substantially identical to it except for containing no amide compound. Such finding is considered to be particularly surprising since the two compositions are almost the same in volume resistivity when unexpanded. Accordingly, the foregoing objects of the present invention have now been found to be readily achieved by using an olefin polymer resin composition which comprises 100 parts by weight of an olefin polymer resin, 5-30 weight percent, based upon the weight of said olefin polymer resin, of an electroconductive carbon black and 0.1-10 weight percent, based upon the weight of said olefin polymer resin, of an amide compound represented by the following formula:

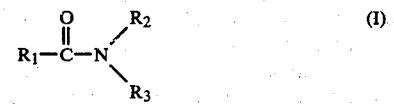

where $R_1$ represents a saturated alkyl group having 8-22 carbon atoms and $R_2$ and $R_3$ individually represent a hydrogen atom or a saturated alkyl group having 1-22 carbon atoms.

In general, said composition is practically used by mixing it with a blowing agent to form a foamable composition and by thereafter expanding same to prepare the desired foam article.

The inevitably necessary condition of the present invention is to use an amide compound represented by the Formula (I) together with an electroconductive carbon black to produce an olefin polymer resin composition.

BRIEF DESCRIPTION OF THE DRAWING

FIG. 1 shows the relationship between the electroconductive carbon black content and the volume resistivity for certain of the Examples and Comparative Examples which are hereinafter more fully described. In such Figure, the resin composition itself and the foamed product made of it are compared.

DETAILED DESCRIPTION OF THE INVENTION

As can be seen from FIG. 1, the amount of the carbon black added has to be increased in order to obtain a foamed product having a relatively low volume resistivity because, in general, even if a non-foamed resin composition has a low volume resistivity, the foamed product made of its shows a higher volume resistivity. This increased carbon black loading typically results in a decrease in closed-cell ratio and an increase in the density of the foamed product. When the amide compound of the present invention is used together with said carbon black material, the volume resistivity of the resin composition itself shows almost no change (i.e., compared to the same composition minus said amide compound). However, the foamed product made of said amide-containing composition shows a remarkably decreased volume resistivity when compared with one to which no amide compound is added and its value is close to that of the resin composition. Accordingly, desirably low volume resistivity can be achieved even though the content of the carbon black is low.

Though the reason why the effect mentioned above is realized is not clear, it is theorized that an amide group has a higher polarity compared with other functional groups and thereby causes a higher dielectric constant. As the result, the presence of the amide compound close to the carbon black particle forms locally high dielectric field under the action of an electric field and plays a role to decrease the amount of the work necessary for the movement of electrons between carbon particles.

Further, it is also theorized that, by the addition of the amide compound of the present invention, the dispersibility of the carbon particles is improved and that breakdown of the chain structure of carbon particles is prevented when the cell walls are extended during expansion of the subject olefin polymer resin compositions.

The electroconductive carbon black used in the present invention can be arbitrarily selected from those conventionally used for the manufacture of known electroconductive resin compositions. As those carbon blacks, there can be exemplified acetylene black, electroconductive furnace black, by-product carbon black and the like. However, the use of an electroconductive furnace carbon black having a particularly large specific surface area (e.g., a specific surface area of 900 m$^2$/g or more) is especially suitable and preferred since the usage thereof provides a low volume resistivity value at relatively low levels of carbon black loading. Indeed, it has been found that the lowest level of volume resistivity is shown when the content of this carbon black is about 20 weight percent or more. As a specific example of such a large specific surface area furnace carbon black, there can be mentioned Ketjenblack EC (trade name of, and manufactured by, Akzo Chemie N.V.).

The amide compound used in the present invention has a structure represented by the Formula (I), above, and it is effective for uniform dispersion of carbon black and for substantial reduction in volume resistivity at a given carbon black loading in a foamed product formed from the subject olefin polymer compositions. In addition, it is an inevitable component for the manufacture of a foamed product having a uniform, fine closed-cellular structure which results in improved cushioning performance and electroconductivity.

While the amount of the amide compound to be added in the present invention varies with the kind of olefin polymer resins used, the kinds and the amounts of the carbon black added, the kind of the blowing agents, the density and the form of the foamed product and so on, it is, in general, employed in an amount ranging from 0.1 to 10 weight percent based on the weight of the olefin polymer resin employed. When the amount of amide employed is less than 0.1 weight percent, it is difficult to obtain the desirably low volume resistivity values and acceptable closed-cellular ratio. On the other hand, when the level of amide employed exceeds 10 weight percent, markedly improved results are not obtained and, in addition, there is seen a tendency that the extrusion stability becomes poor. Preferably, the Formula I amide compound is employed in an amount of from 0.3 to 8 weight percent based upon the weight of the olefin polymer resin employed.

The amount of the electroconductive carbon black suitably employed in the present invention varies somewhat depending upon the resin used, the blowing agent employed, the form of the foamed product, required etc.) and, further, upon the amount of the amide compound used. However, as a general rule said carbon black is employed in an amount sufficient to cause a foam product formed from the subject polymer composition to have a volume resistivity of $1 \times 10^8 \Omega$.cm or less (preferably from $1 \times 10^3 \Omega$.cm to $1 \times 10^7 \Omega$.cm) and typically the amount of said carbon black which is sufficient to do so will range from 5 to 30 weight percent based on the weight of the olefin polymer resin used. When said carbon black is employed in an amount less than 5 weight percent, a sufficient electroconductivity can generally not be obtained. On the other hand, when it exceeds 30 weight percent, it is generally impossible to manufacture a highly foamed product having the desired closed-cellular structure. Also, the flexibility which is a generally desired property of an olefin polymer resin foamed product is notably deteriorated at carbon black loadings above 30 weight percent, thereby resulting in an inferior cushioning capability.

In view of the foregoing and in order to economically achieve both high cushioning capability and low volume resistivity at the same time, it is generally preferable to employ the carbon black at levels in the range of from 10 to 20 weight percent based upon the weight of the olefin polymer resin employed.

In short, then, and in accordance with the present invention, a packaging material, which can suitably protect precise electronic parts from electrostatic breakdown and which has high cushioning capability can be manufactured by the use of an appropriate combination of the aforementioned amide compound and the above-noted electroconductive carbon black material in an olefin polymer resin foam composition.

As the amide compound used in the present invention, any amide compound which satisfies the Formula (I) above can be employed. For instance, those compounds wherein $R_3$ in the Formula (I) is a hydrogen atom and each of $R_1$ and $R_2$ is an alkyl group having a long chain structure consisting of 8 to 22 carbon atoms, for example, N-stearyl stearamide, N-palmityl stearamide, etc., show an excellent effect. Other than those mentioned above, there can be illustrated, for example, lauric acid amide, myristic acid amide, palmitic acid amide, stearic acid amide, N-methylstearic acid amide, N-lauryl lauric acid amide, N,N-dimethylstearic acid amide, N,N-diethylstearic acid amide and the like.

When any additive other than the Formula (I) amide compound is used, a suitable combination of electroconductivity and closed-cellular structure of the resulting foamed product is not obtained. For instance, when a fatty (e.g., higher alkyl) amine is used in place of the Formula (I) amide compound relatively low volume resistivity is observed but the surface resistivity of the resulting foam product is unacceptably high. Such fatty amine is, therefore, essentially useless in the prevention of the electrostatic breakdown of electronic appliance parts. On the other hand, when a wax or a fatty acid is used in place of the Formula (I) amide compound, the resulting foam products have substantially higher levels of surface and volume resistivity than is obtained when said Formula (I) amine compound is employed.

The olefin polymer resin used for the composition of the present invention includes those compounds which are prepared using an olefin as the main component, for example, low density polyethylene, medium and high density polyethylene, isotactic polypropylene, polybutene-1, copolymer of ethylene or propylene and other copolymerizable monomer, for example, propylene-octene-1-ethylene copolymer, ethylene-propylene copolymer, ethylene-vinyl acetate copolymer, ethylene-acrylic acid copolymer, ethylene-ethyl acrylate copolymer, ethylene-vinyl chloride copolymer, zinc, sodium, calcium, or magnesium salt of ethylene-acrylic acid copolymer and the like. These resins may be used individually or in combination. Among these resins, polyethylene and/or ethylene-vinyl acetate copolymer is preferable. More preferably is a low density polyethylene having a melt index of 1 to 30 decigrams/minute and a density of 0.910 to 0.930 g/cc.

As to the method of incorporating the amide compound and the carbon black into the resin in the practice of the present invention, there is no limitation so long as the machine used has a blending and kneading capability. For example, there can be used a Banbury mixer, intermixer, rolls, single- or twin-screw extruder and the like. Also, there is no particular limitation on the order of blending and kneading. The amide compound and the carbon black may be blended and kneaded with the resin in any order. However, it is generally preferred, in order to improve the dispersibility of the carbon black, to pre-blend the amide compound and the carbon black and to then blend the resulting pre-blended mixture with the resin.

In the preparation of a foamed product from the composition of the present invention, those methods already known in the art can be used. For instance, there can be employed a continuous extrusion method wherein the resin composition of the present invention is heated and melted, a blowing agent is blended into and admixed with the molten resin composition at elevated temperature and the resulting foamable blend is extruded to a low pressure zone for foaming. Alternatively, a batch type method may be employed wherein a blowing agent is added to the resin composition at an elevated temperature under high pressure and the pressure is reduced for foaming. Still further, a different type of method can be used wherein the resin composition is admixed with a blowing agent and cross-linked by electron beams, chemical cross-linking agent and the like and the resulting composition is subsequently heated in order to accomplish the desired foaming and the like. Among the foregoing methods, the effect of the present invention is most pronounced and beneficial when the composition is expanded to five or more times the original unexpanded volume by means of extrusion-foaming.

The blowing agent used when the foamed product is manufactured is an ordinary chemical blowing agent or a volatile blowing agent. Preferably, a volatile organic blowing agent is recommended and there may be used any one having a boiling point lower than the melting point of said olefin polymer resin.

Typical blowing agents include lower hydrocarbons such as propane, butane, pentane, pentene and hexane, and halogenated hydrocarbons such as methylene chloride, methyl chloride, tirchlorofluoromethane, dichlorofluoromethane, chlorodifluoromethane, chlorotrifluoromethane, dichlorodifluoromethane, 1,1'-difluoroethane, 1-chloro-1,1-difluoroethane, 1,2-dichlorotetrafluoroethane and monochloropentafluoroethane. A mixture of them is also useful. As chemical blowing agents, there are azodicarbonamide, paratoluenesulfonylhydrazide and the like. Also the combination of such a chemical blowing agent and a volatile organic blowing agent mentioned above can be used, if desired.

The resin composition of the present invention can contain a small amount of a cell controlling (e.g., nucleating) agent such as fine powdery inorganic compound or calcium stearate.

Also, when occasion demands, the addition of an ultraviolet light absorber and antioxidant is possible.

The composition of the present invention can be applied to foamed products in any shape, for example, sheet, block, bar, tube, clading of electric wire and cable, product molded with a mold and the like.

The present invention is further illustrated by the following Examples and Comparative Examples.

EXAMPLE 1 AND COMPARATIVE EXAMPLE 1

Stearylstearamide and an electroconductive carbon black were added to a low density polyethylene resin (grade M-2151, low density polyethylene having density: 0.921 g/cm$^3$ and M.I.=2.5, manufactured by Asahi Dow Limited) in accordance with ratios shown in Table 1. The mixture was fed to a 5-liter Banbury mixer, heated, and kneaded with the mixer jacket temperature set at 120° C. and at a mixing speed of 750 r.p.m. for 15 minutes followed by pelletizing.

Said composition was extruded with an extruder equipped with a die kept at 105° C. having an orifice. As the blowing agent, 1,2-dichlorotetrafluoroethane was used in an amount of 23 weight parts per 100 weight parts of said composition and it was injected under pressure into the barrel of said extruder. The density, closed-cellular content and volume resistivity of the resulting foam product are shown in Table 1.

As will be apparent from Table 1, the foamed compositions to which no amide compound was added show a high volume resistivity whereas the foamed products wherein the amide compound was used show remarkably reduced volume resistivity by comparison. In addition, it can also be seen that the closed-cellular content is favorably increased by the use of the stearyl stearamide additive. Thus, there can be obtained an electroconductive foamed product having high electroconductivity and high cushioning capability.

Also, it can be seen that when, among the electroconductive carbon blacks, an electroconductive furnace black having a large specific surface area was used (i.e., Ketjenblack EC in Example 1), it gave a low volume resistivity even though the amount thereof blended was relatively small. As such, it facilitated the obtention of a foamed product having a lower density and a higher closed-cellular ratio as well as desirably low volume resistivity.

TABLE 1

| | No. | Electroconductive Carbon Black (weight percent) | Additive (weight percent) | Foam Density (g/cm$^3$) | Closed Cells (percent) | Volume Resistivity Ω · cm |
|---|---|---|---|---|---|---|
| Example 1 | 1 | Ketjenblack EC$^a$ (12.5) | Stearyl-stearamide (2) | 0.035 | 90 | $1 \times 10^5$ |
| | 2 | Denkablack$^b$ (20.0) | Stearyl-stearamide | 0.064 | 76 | $3 \times 10^6$ |

TABLE 1-continued

| | No. | Electroconductive Carbon Black (weight percent) | Additive (weight percent) | Foam Density (g/cm³) | Closed Cells (percent) | Volume Resistivity Ω · cm |
|---|---|---|---|---|---|---|
| | 3 | Vulcan XC-72[c] (20.0) | Stearyl-stearamide (2) | 0.068 | 62 | $2 \times 10^7$ |
| Comparative Example 1 | 4 | Ketjenblack EC[a] (12.5) | None | 0.048 | 68 | $2 \times 10^8$ |
| | 5 | Denkablack[b] (20.0) | None | 0.087 | 51 | $6 \times 10^{14}$ |
| | 6 | Vulcan XC-72[c] (20.0) | None | 0.094 | 50 | $8 \times 10^{14}$ |

Notes:
[a]Trade name, an electroconductive furnace black manufactured by Akzo Chemie N.V.
[b]Trade name, an acetylene black manufactured by Denki Kagaku Kogyo Co., Ltd.
[c]Trade name, an electroconductive furnace black manufactured by Cabot Corp., U.S.A.

EXAMPLE 2 AND COMPARATIVE EXAMPLE 2

An electroconductive carbon black and stearylstearamide were mixed with the same resin as that used in Example 1 in accordance with ratios shown in Table 2 and the same procedure as that employed in Example 1 was repeated to obtain foamed products. The properties of the foamed products and the volume resistivity of a collapsed foam sheet obtained by heat-pressing of the foamed product are shown in Table 2.

FIG. 1 shows the relation between the content of the electroconductive carbon black and the volume resistivity in the case of foamed product and unexpanded product. Symbols ■ and Δ represent the case of unexpanded product wherein the amide compound was added (Nos. 7 to 10 in Table 2) and product wherein no amide compound was added (Nos. 12 to 14 in Table 2), respectively. Symbols ● and O represent the case of foamed product wherein the amide compound was added and that wherein no amide compound was added

TABLE 2

| | No. | Electro-conductive Carbon Black (weight percent) | Additive (weight percent) | Foam Properties Density (g/cm³) | Foam Properties Percent Closed Cells | Foam Properties Volume Resistivity (Ω · cm) | Volume Resistivity Of Sheet Obtained By Heat-Pressing Foamed Product (Ω · cm) |
|---|---|---|---|---|---|---|---|
| Example 2 | 7 | Ketjenblack EC (5) | Stearyl-stearamide (0.3) | 0.035 | 94 | $8 \times 10^{13}$ | $2 \times 10^{13}$ |
| | 8 | Ketjenblack EC (9.9) | Stearyl-stearamide 1.0 | 0.034 | 92 | $1 \times 10^7$ | $8 \times 10^4$ |
| | 9 | Ketjenblack EC (14.8) | Stearyl-stearamide (1.6) | 0.038 | 85 | $2 \times 10^4$ | $8 \times 10^3$ |
| | 10 | Ketjenblack EC (19.6) | Stearyl-stearamide (2.1) | 0.045 | 80 | $1 \times 10^4$ | $4 \times 10^3$ |
| | 11 | Denkablack (30) | Stearyl-stearamide (8) | 0.087 | 21 | $7 \times 10^6$ | $5 \times 10^5$ |
| Comparative Example 2 | 12 | Ketjenblack EC (10) | None | 0.035 | 75 | $3 \times 10^9$ | $7 \times 10^4$ |
| | 13 | Ketjenblack EC (15) | None | 0.038 | 61 | $4 \times 10^7$ | $9 \times 10^3$ |
| | 14 | Ketjenblack EC (20) | None | 0.050 | 55 | $1 \times 10^6$ | $5 \times 10^3$ |
| | 15 | Denkablack (35) | Stearyl-stearamide (10) | 0.439 | 3 | $3 \times 10^5$ | $1 \times 10^4$ |

As will be apparent from Table 2, the composition containing 5 weight percent of the electroconductive carbon black shows a relatively high volume resistivity. Consequently, it can be seen that at least 5 weight percent is required to reveal a satisfactory antistatic performance. On the other hand, it can be seen that, when the amount of the electroconductive carbon black exceeds 30 weight percent, the closed-cellular ratio is rapidly decreased and the density of the foamed product is markedly increased.

(Nos. 7 to 10 and Nos. 12 to 14), respectively. As can be seen from FIG. 1, the addition of the amide compound provides essentially no improvement in electroconductivity to the subject olefin polymer composition in unexpanded foam. On the other hand, in the case of the foamed product, when the amide compound was added, the volume resistivity is markedly decreased compared with that containing no amide compound. Thus, it can be seen that the use of the amide compound is quite beneficial in the context of the subject electroconductive olefin polymer foam.

EXAMPLE 3 AND COMPARATIVE EXAMPLE 3

Ketjenblack EC and various additives were mixed with the same resin as that in Example 1 in accordance with ratios shown in Table 3 and the same procedure as that in Example 1 was repeated to obtain foamed products. The properties of the resulting foam products are shown in Table 3.

TABLE 3

| | No. | Content of Ketjenblack EC (weight percent) | Additive (weight percent) | Blowing Agent (weight percent) | Density of Foamed Product (g/cm$^3$) | Percent Closed Cells | Volume Resistivity ($\Omega \cdot$ cm) | Surface Resistivity ($\Omega \cdot$ cm) |
|---|---|---|---|---|---|---|---|---|
| Example 3 | 16 | 12.3 | Stearamide (1.3) | D$^1$ | 0.037 | 86 | $2 \times 10^5$ | $1 \times 10^6$ |
| | 17 | " | Palmitamide (1.3) | " | 0.039 | 84 | $2 \times 10^5$ | $1.5 \times 10^6$ |
| | 18 | " | Stearylstearamide (4.0) | " | 0.035 | 86 | $9 \times 10^4$ | $7 \times 10^5$ |
| | 19 | " | Stearylstearamide (2.0) | " | 0.035 | 88 | $1 \times 10^5$ | $9 \times 10^5$ |
| | 20 | " | N—Palmitylstearamide (3.0) | " | 0.041 | 87 | $1 \times 10^5$ | $1 \times 10^6$ |
| Comparative Example 3 | 21 | (12.3) | W$^2$ (1.3) | D$^1$ | 0.037 | 81 | $2 \times 10^7$ | $1 \times 10^8$ |
| | 22 | " | Stearic acid (1.3) | " | 0.037 | 79 | $1 \times 10^9$ | $2 \times 10^{10}$ |
| | 23 | " | Stearyl amine | " | 0.034 | 80 | $3 \times 10^6$ | $2 \times 10^{11}$ |

Notes:
$^1$1,2-dichlorotetrafluoroethane, 23 parts.
$^2$Wax (low molecular weight PE)

On the basis of the results presented in Table 3, it can be seen that electroconductive foam products having a satisfactory combination of properties overall are not obtained when low molecular weight polyethylene (PE) wax, stearic acid or stearyl amine is employed in place of the indicated saturated fatty acid amides. For instance, when stearyl amine, stearic acid and polyethylene wax is used, the resulting products have much higher surface resistivity as well as having higher volume resistivity. Thus, it can be seen that, even though the chain length of the additive may be the same, different functional groups have different effects on electrical characteristics of the foamed product.

In view of the foregoing, it can be readily seen that the present invention can suitably provide a foamed olefin polymer product having excellent electroconductivity and cushioning capability. As such, the foams obtained from the compositions of this invention are most useful as packing and cushioning materials for electronic parts and the like.

What is claimed is:

1. An electroconductive olefin polymer foam article which comprises 100 parts by weight of an olefin polymer resin, from 5 to 30 weight percent, based upon said olefin polymer resin, of an electroconductive carbon black and from 0.1 to 10 weight percent, based upon said olefin polymer resin, of a saturated amide compound of the following formula:

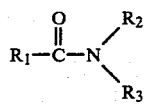 (I)

wherein R$_1$ represents an alkyl group having from 8 to 22 carbon atoms and wherein R$_2$ and R$_3$ individually represent a hydrogen atom or an alkyl group having from 1 to 22 carbon atoms.

2. The foam article of claim 1 wherein the electroconductive carbon black is an electroconductive furnace carbon black having a specific surface of at least about 900 m$^2$/g.

3. The foam article of claim 1 wherein the Formula (I) amide compound is employed in an amount ranging from 0.3 to 8 weight percent based upon the weight of said olefin polymer resin.

4. The foam article of claim 1 wherein the electroconductive carbon black is employed in an amount ranging from 10 to 20 weight percent based upon the weight of said olefin polymer resin.

5. The foam article of claim 1 wherein the olefin polymer resin employed is a low density polyethylene having a melt index of from 1 to 30 decigrams/minute and a density of from 0.910 to 0.930 g/cc.

6. The foam article of claim 1 wherein said foam article has a density which is at least 5 times less than that of the unexpanded olefin polymer composition from which it was prepared.

7. An expandable olefin polymer composition which comprises 100 parts by weight of an olefin polymer resin, a blowing agent, from 5 to 30 weight percent, based upon said olefin polymer resin, of an electroconductive carbon black and from 0.1 to 10 weight percent, based upon said olefin polymer resin, of a saturated amide compound represented by the following formula:

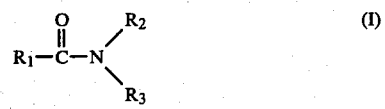 (I)

wherein R$_1$ represents an alkyl group having from 8 to 22 carbon atoms and R$_2$ and R$_3$ individually represent a hydrogen atom or an alkyl group having from 1 to 22 carbon atoms.

8. The expandable polymer composition of claim 7 wherein the electroconductive carbon black is an electroconductive furnace carbon black having a specific surface of at least about 900 m$^2$/g.

9. The expandable polymer composition of claim 7 wherein the Formula (I) amide compound is employed in an amount ranging from 0.3 to 8 weight percent based upon the weight of said olefin polymer resin.

10. The expandable polymer composition of claim 7 wherein the electroconductive carbon black is employed in an amount ranging from 10 to 20 weight percent based upon the weight of said olefin polymer resin.

11. The expandable polymer composition of claim 7 wherein the olefin polymer resin employed is a low density polyethylene having a melt index of from 1 to 30 decigrams/minute and a density of from 0.910 to 0.930 g/cc.

12. The expandable polymer composition of claim 7 wherein the blowing agent is a volatile organic blowing agent.

* * * * *